(12) United States Patent
Miskell et al.

(10) Patent No.: US 8,393,208 B2
(45) Date of Patent: Mar. 12, 2013

(54) MEASURING OF FLUID IN A VESSEL WITH TWO COAXIAL CABLE SECTIONS AND A COUPLING THEREBETWEEN USING TIME DOMAIN REFLECTOMETRY

(75) Inventors: Thomas Miskell, Merrimack, NH (US); George Ki, Windham, NH (US)

(73) Assignee: Meggitt (New Hampshire), Inc., Londonderry, NH (US)

( * ) Notice: Subject to any disclaimer, the term of this patent is extended or adjusted under 35 U.S.C. 154(b) by 0 days.

(21) Appl. No.: 12/901,463

(22) Filed: Oct. 8, 2010

(65) Prior Publication Data

US 2011/0209543 A1    Sep. 1, 2011

Related U.S. Application Data

(63) Continuation of application No. 12/243,511, filed on Oct. 1, 2008.

(60) Provisional application No. 60/976,615, filed on Oct. 1, 2007.

(51) Int. Cl.
*G01F 23/00* (2006.01)

(52) U.S. Cl. .................................................. 73/290 V

(58) Field of Classification Search ................ 73/290 V
See application file for complete search history.

(56) References Cited

U.S. PATENT DOCUMENTS

| | | | |
|---|---|---|---|
| 3,474,337 A * | 10/1969 | Petrick | 324/644 |
| 3,874,237 A | 4/1975 | Zwarts | |
| 4,161,704 A * | 7/1979 | Schafer | 333/33 |
| 4,596,144 A | 6/1986 | Panton et al. | |
| 4,786,857 A * | 11/1988 | Mohr et al. | 73/304 R |
| 5,457,990 A | 10/1995 | Oswald et al. | |
| 5,610,611 A | 3/1997 | McEwan | |
| 5,734,346 A | 3/1998 | Richardson et al. | |
| 5,827,985 A | 10/1998 | Grieger et al. | |
| 5,841,666 A | 11/1998 | Perdue et al. | |
| 5,943,908 A | 8/1999 | Innes et al. | |
| 5,973,637 A | 10/1999 | Perdue et al. | |
| 6,078,280 A | 6/2000 | Perdue et al. | |
| 6,138,508 A | 10/2000 | Hannan et al. | |
| 6,232,910 B1 | 5/2001 | Bell et al. | |
| 6,281,801 B1 | 8/2001 | Cherry et al. | |

(Continued)

FOREIGN PATENT DOCUMENTS

| | | |
|---|---|---|
| DE | 102004032965 A1 | 2/2006 |
| EP | 0042186 A1 | 12/1981 |

(Continued)

OTHER PUBLICATIONS

A. Cataldo, A. Lay-Ekuakille, C. Decarlo, Remote Sensing of Liquid Characteristics Using time Domain Reflectometry, Earth Observing Systems VII, Proceedings of APIE vol. 4814 (2002) p. 465-473 AGM Industries S.p.A., Martignnano Lecce, Italy.

*Primary Examiner* — Hezron E Williams
*Assistant Examiner* — Nathaniel Kolb
(74) *Attorney, Agent, or Firm* — Peter A. Nieves; Sheehan Phinney Bass & Green PA (57) ABSTRACT

An apparatus and method for measuring a level of a liquid is provided. Generally, the apparatus contains a first coaxial cable section including a first center conductor, a first outer conductor and a solid dielectric between the first center conductor and first outer conductor. The apparatus also contains a second coaxial cable section including a second center conductor, a second outer conductor and an air dielectric between the second center conductor and second outer conductor. Further, a coupling is provided between the first and second coaxial cable sections, wherein the second coaxial cable section is disposed in a liquid for determining a level of the liquid.

14 Claims, 9 Drawing Sheets

U.S. PATENT DOCUMENTS

| | | |
|---|---|---|
| 6,297,969 B1 | 10/2001 | Mottahed |
| 6,504,793 B2 | 1/2003 | Fuenfgeld |
| 6,556,511 B1 | 4/2003 | Welke |
| 6,559,657 B1 | 5/2003 | McCarthy et al. |
| 6,626,038 B1 | 9/2003 | Carsella et al. |
| 6,640,629 B2 | 11/2003 | Carsella |
| 6,644,114 B1 * | 11/2003 | McEwan .................... 73/290 R |
| 6,650,280 B2 | 11/2003 | Arndt et al. |
| 6,690,320 B2 | 2/2004 | Benway et al. |
| 6,701,783 B2 * | 3/2004 | Fehrenbach et al. ........ 73/290 V |
| 6,906,662 B2 | 6/2005 | Faust et al. |
| 7,012,437 B2 | 3/2006 | Klofer |
| 7,068,051 B2 | 6/2006 | Anderson |
| 7,162,922 B2 | 1/2007 | Freger et al. |
| 7,165,450 B2 | 1/2007 | Jamnia et al. |
| 7,918,133 B2 | 4/2011 | Volpe et al. |
| 2001/0035048 A1 * | 11/2001 | Gualtieri .................... 73/290 V |
| 2002/0101373 A1 | 8/2002 | Arndt et al. |
| 2004/0007061 A1 | 1/2004 | Forgue |
| 2004/0027137 A1 | 2/2004 | Sherrard |
| 2005/0192727 A1 | 9/2005 | Shostak et al. |
| 2006/0225499 A1 | 10/2006 | Gravel et al. |
| 2007/0081617 A1 | 4/2007 | Fudge |
| 2007/0204689 A1 | 9/2007 | Bostrom |
| 2009/0235737 A1 | 9/2009 | Lavon et al. |
| 2009/0249870 A1 * | 10/2009 | Volpe et al. .................. 73/290 R |
| 2010/0153029 A1 | 6/2010 | Miskell et al. |
| 2011/0241698 A1 | 10/2011 | Carvalho et al. |
| 2011/0282599 A1 | 11/2011 | Lavon et al. |

FOREIGN PATENT DOCUMENTS

| | | |
|---|---|---|
| EP | 0473082 A | 3/1992 |
| EP | 2012098 A1 | 1/2009 |
| EP | 2198252 A1 | 6/2010 |
| GB | 24466162 A | 6/2010 |
| WO | WO9619715 A | 6/1996 |
| WO | WO9926080 A | 5/1999 |
| WO | 01/63219 A2 | 8/2001 |
| WO | 02/25277 A1 | 3/2002 |
| WO | WO2009046103 A | 4/2009 |

* cited by examiner

MEASURING OF FLUID IN A VESSEL WITH TWO COAXIAL CABLE SECTIONS AND A COUPLING THEREBETWEEN USING TIME DOMAIN REFLECTOMETRY

CROSS-REFERENCE TO RELATED APPLICATION

This application is a continuation of, and claims priority to, U.S. nonprovisional patent application entitled "System and Method For Accurately Measuring Fluid Level In A Vessel," having Ser. No. 12/243,511, filed Oct. 1, 2008, which claims priority to U.S. provisional patent application No. 60/976,615, entitled, "Time Domain Reflectrometry," filed Oct. 1, 2007, both of which are hereby incorporated herein by reference in their entirety.

FIELD OF THE INVENTION

The present invention is generally related to fluid sensors, and more particularly is related to a fluid level sensor capable of compensating for multiple circumstances to provide an accurate fluid level reading.

BACKGROUND OF THE INVENTION

In many different fields there is a need to know a current level of fluid within a vessel. One method used to determine a current level of fluid within a vessel is the use of time domain reflectometry (TDR). As is known by those having ordinary skill in the art, TDR analysis includes the use of propagation of a step or pulse of energy having a sharp edge, also referred to as an interrogation, or excitation, signal, down a waveguide and into a system, and the subsequent observation of the energy reflected by the system. With the analyzing of the magnitude, duration, and shape of the reflected waveform, the nature of impedance variation in the transmission system can be determined.

Unfortunately, maintaining an accurate measurement of fluid level is difficult. As previously mentioned, in a TDR system an interrogation signal is transmitted down a transmission line. A transmission line passing through different media will have regions of different dielectric. As a result, the reflected waveform will contain discontinuities at times that represent dielectric changes along the transmission line. In addition, traditional TDR systems continuously sweep the entire transmission line for a time span that corresponds to when a reflection of an originating signal is received, where the originating signal traveled from one end of the transmission line to the other. This process is repeated each time a new level indication is needed, which is a processing burden resulting in a costly system requiring excess power usage.

Currently there is a need for an accurate, reliable, and safe method of measuring the amount of fluid in a container. An example of such a fluid may include, for example, a fuel tank containing volatile fluids. Thus, a heretofore unaddressed need exists in the industry to address the aforementioned deficiencies and inadequacies.

SUMMARY OF THE INVENTION

Embodiments of the present invention provide an apparatus and method for accurately measuring fluid level in a vessel. Briefly described, in architecture, one embodiment of the apparatus, among others, can be implemented as follows. The apparatus contains a first coaxial cable section including a first center conductor, a first outer conductor and a solid dielectric between the first center conductor and first outer conductor. The apparatus also contains a second coaxial cable section including a second center conductor, a second outer conductor and an air dielectric between the second center conductor and second outer conductor. Further, a coupling is provided between the first and second coaxial cable sections, wherein the second coaxial cable section is disposed in a liquid for determining a level of the liquid.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The present invention is a fluid level detection probe capable of accurately determining fluid levels in a vessel or container. For exemplary purposes, the present probe is described as a fuel level probe being capable of being positioned within a fuel tank. In such an example, the fuel level probe may be used to provide accurate measurement of gas or oil levels within a tank. It should be noted, however, that the type of fluid and the type of vessel is not intended to be limited by the present description.

Figure 1:
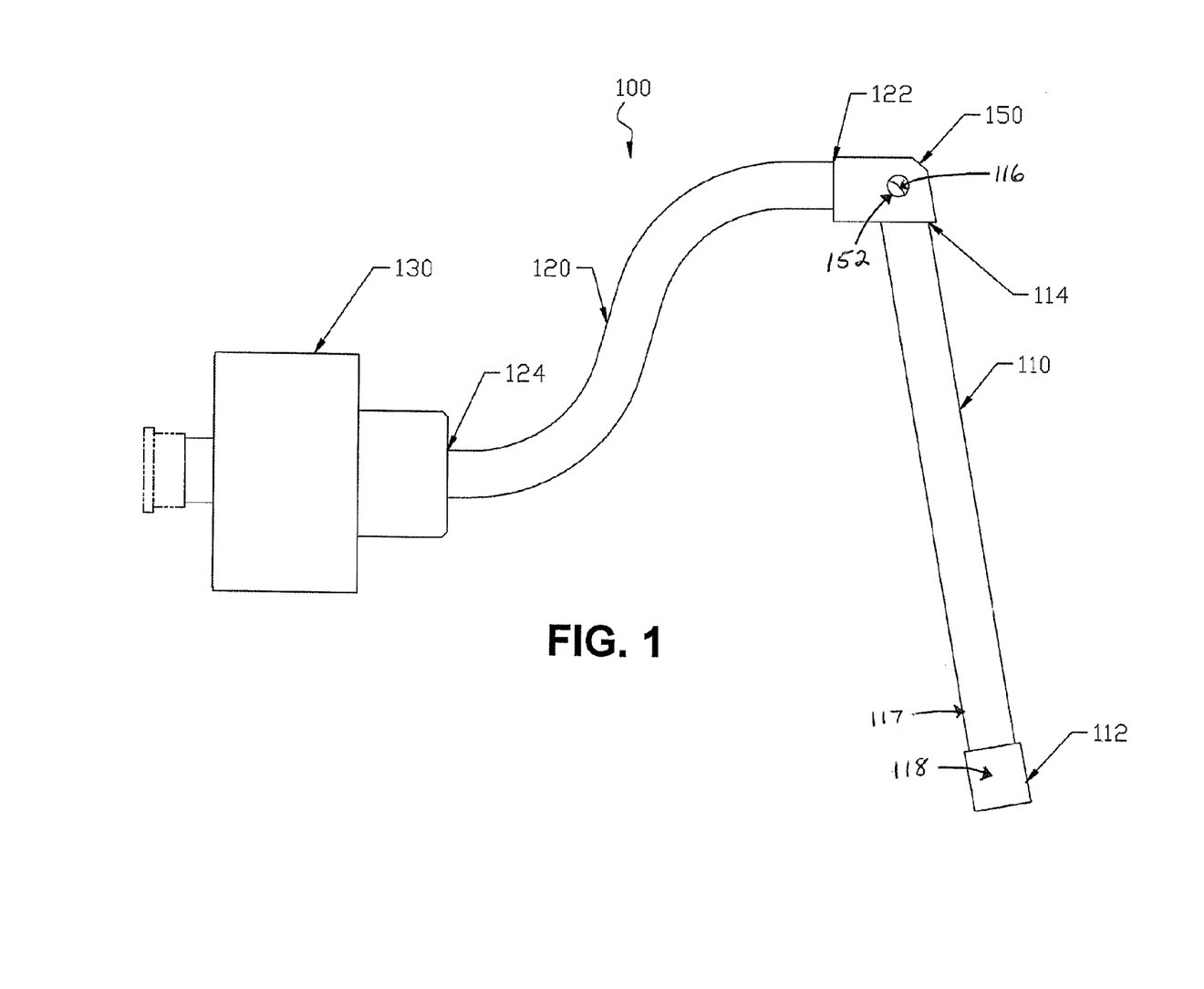
FIG. 1 is a schematic diagram illustrating the probe in accordance with a first exemplary embodiment of the invention.

FIG. 1 is a schematic diagram illustrating the probe 100 in accordance with a first exemplary embodiment of the invention. As is shown by FIG. 1, the probe 100 contains an elongated portion 110, a shaped arm 120, and a sensor 130. The elongated portion 110 is a coaxial tube having a hollow center. As per definition of a coaxial tube, the elongated portion 110 contains a center conductor 116 therein and an outer shell 117. It should be noted that in the present description, the shaped arm 120 is also referred to herein as a first coaxial cable section. In addition, the elongated portion 110 is also referred to herein as a second coaxial cable section.

The elongated portion 110 is shaped and lengthened to allow for positioning within a fuel tank, wherein a distal end 112 of the elongated portion 110 extends toward a bottom of the fuel tank, in which the elongated portion 110 may be positioned. Having the elongated portion 110 hollow allows fluid to enter the elongated portion 110, via the distal end 112, into the hollow portion to enable fluid level determination, as is explained in detail below.

As shown by FIG. 1, an end cap 118 is located at the distal end 112 of the elongated portion 110. The end cap 118 may be fitted so as to cover the distal end 112 of the elongated portion 110. To allow fluid to enter the elongated portion 110, as mentioned above, the end cap 118 contains at least one opening (not shown).

A proximate end 114 of the elongated portion 110 joins a distal end 122 of the arm 120. The connection between the elongated portion 110 and the arm 120 is provided in a manner so as to allow the combination of the arm 120 and the elongated portion 110 to create a waveguide for an electromagnetic pulse provided by the sensor 130. In addition, the combination of the elongated portion 110 and the arm 120 is coaxial in shape.

As shown by FIG. 1, a connector 150 provides the connection between the elongated portion 110 and the arm 120, so as to align the elongated portion 110 and the arm 120 at a predetermined angle. Both the elongated portion 110 and the arm 120 may be connected to the connector 150 through any of the suitable techniques known in the art. The connector 150 contains at least one hole 152 therein, for allowing the progression of air out of the probe 110 when fluid enters the elongated portion 110. Preferably, the connector 150 contains the center conductor 116 of the elongated portion 110 therein, which is an extension of a center conductor 121 (FIG. 3) of the arm 120. In addition, the connector 150 is conductive, with a dielectric extending between the center conductor 116 of the elongated portion 110 and a surface of the connector 150. The dielectric extending between the center conductor 116 of the elongated portion 110 and the surface of the conductor 150 is at least partially air dielectric.

It should be noted that in accordance with an alternative embodiment of the invention, the probe 100 may instead be positioned so that the distal end 112 of the elongated portion 110 extends toward a top of the fuel tank, with the connector 150 adjacent to a bottom of the fuel tank. In such an embodiment, the hole 152 would allow for the progression of fluid into the hole 152 and up the elongated portion, while air progresses out of the opening of the end cap 118.

Figure 9:
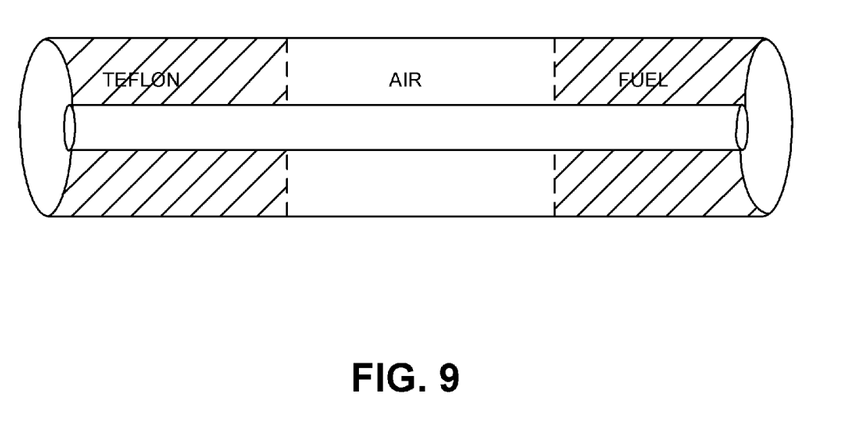
FIG. 9 is a cross-section of an exemplary embodiment of the probe, providing an example of the center conductor remaining spaced apart from the outer shell of the elongated portion.

While FIG. 1 illustrates the connector 150 joining the elongated portion 110 and the arm 120, in accordance with an alternative embodiment of the invention, the probe 100 may instead be fabricated to have the elongated portion 110 and the arm 120 as one piece, an example of which is shown by FIG. 9.

The elongated portion 110 and an outer shell of the shaped arm 120 are made of a conductive material having a known impedance, such as, for example, but not limited to, aluminum. It should be noted that other metals may be used as well. In view of the conductive nature of the outer shell 117 of the elongated portion 110, one having ordinary skill in the art will appreciate that the center conductor 116 must remain spaced apart from the outer shell 117 of the elongated portion 110 to ensure that the probe 100 does not become shorted. FIG. 9 is a cross-section of an exemplary embodiment of the probe 100, providing an example of the center conductor 116 remaining spaced apart from the outer shell 117 of the elongated portion 110.

While the arm 120 contains the center conductor 121 (FIG. 3) therein that extends throughout the arm 120, the arm 120 is also filled with a dielectric 123 such as, but not limited to, Teflon. The Teflon fill is a solid dielectric. Use of a Teflon fill, in accordance with the present invention, serves at least two purposes. First, the Teflon fill provides impedance matching, as is described in more detail below, and second, the Teflon provides a means to prevent fluid ingression to a non-gauging portion of the probe 100, thereby eliminating unwanted reflections due to multiple fluid levels inside of the probe 100.

In accordance with the present invention, an electromagnetic excitation signal, also referred to herein as an interrogation signal, is sent by the sensor 130 into a transmission line, wherein the transmission line includes the combination of the arm 120, the elongated portion 110, and beyond the distal end 112 of the elongated portion 110. The transmission line has three sections. A first section of the transmission line is from an excitation source, such as the sensor 130, to a top of the probe 100, also referred to as the distal end 122 of the arm 120 (also referred to as the beginning of the gauge-able area). A second section of the transmission line is from the top of the probe 100 (the distal end 122 of the arm 120) to a bottom of the probe 100, also referred to as the distal end 112 of the elongated portion 110. The second section of the transmission line is also referred to as the gauge-able area. A third section of the transmission line is from the bottom of the probe 100 to the end of a transmission that runs past the end, or distal portion 112, of the gauge-able area. The third section of the transmission line, optionally, is placed here to allow for impedance matching to the media being measured, as is described in additional detail below.

It should be noted that having the probe 100 as coaxial in shape and partially filled with Teflon, or similar material, provides multiple advantages, such as, but not limited to, allowing for a constant impedance up to the gauging area and delimiting the gauging area. In addition, this allows the probe 100 to be mounted horizontally below a fluid level, without multiple reflections from the fluid. Further, this configuration provides wet-to-dry side isolation. Still further, the configuration also provides mechanical means of attaching the elongated portion 110 to the sensor 130, thereby providing a more solid structure.

In accordance with the first exemplary embodiment of the invention, the arm 120 of the probe 100 is shaped like an "S." It should be noted that the shape of the arm may be different from the shape described herein. The presently disclosed shape is beneficial due to the contour of the arm 120 allowing the probe 100 to rest on a lip of an entrance to a fuel tank, such as on the wing of an airplane, while the elongated portion 110 of the probe 100 extends within the fuel tank and the sensor 130 remains outside of the fuel tank. It should be noted, however, that the arm 120 may be provided in other shapes so as to accommodate location of a fuel tank for which the probe 100 is used. It should also be noted that the curved shape of the arm 120 allows for side mounting of the probe 100 within a tank. Alternatively, the arm 120 may be a wire, or the probe 100 may not even include an arm 120, but instead, have a direct connection from the sensor 130 to the elongated portion 110.

Figure 2:
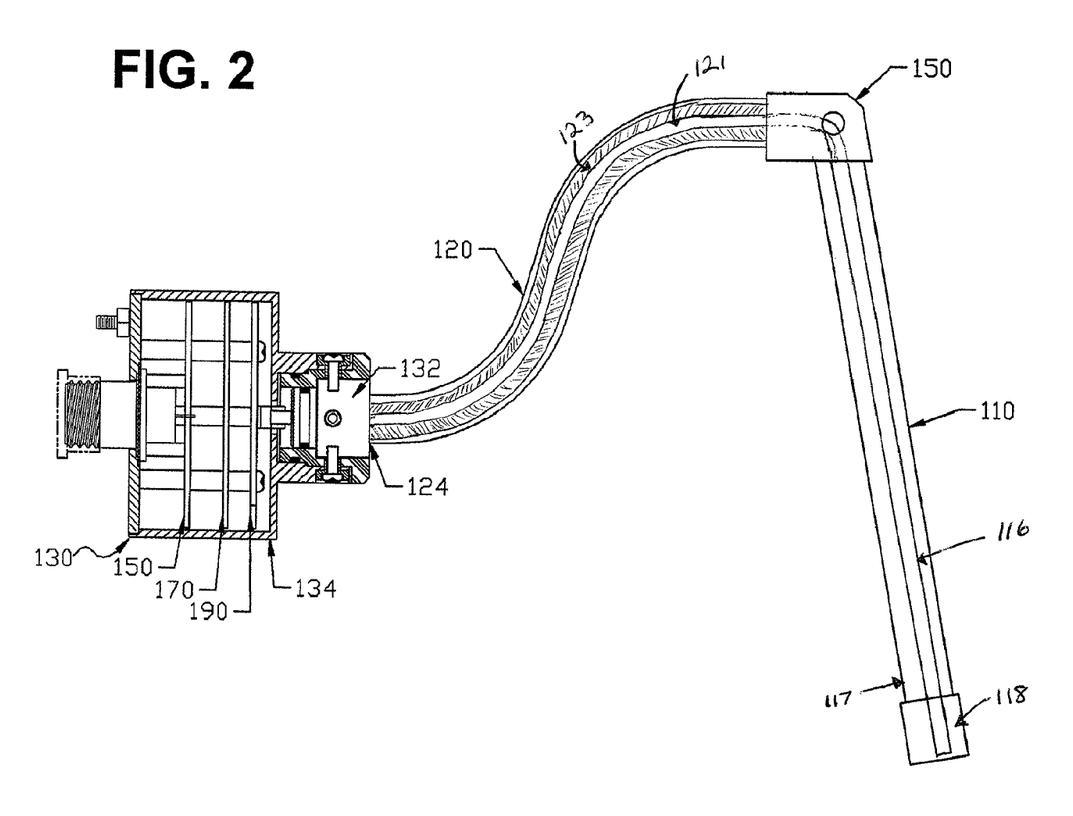
FIG. 2 is a cross-sectional view of the probe of FIG. 1.
Figure 3:
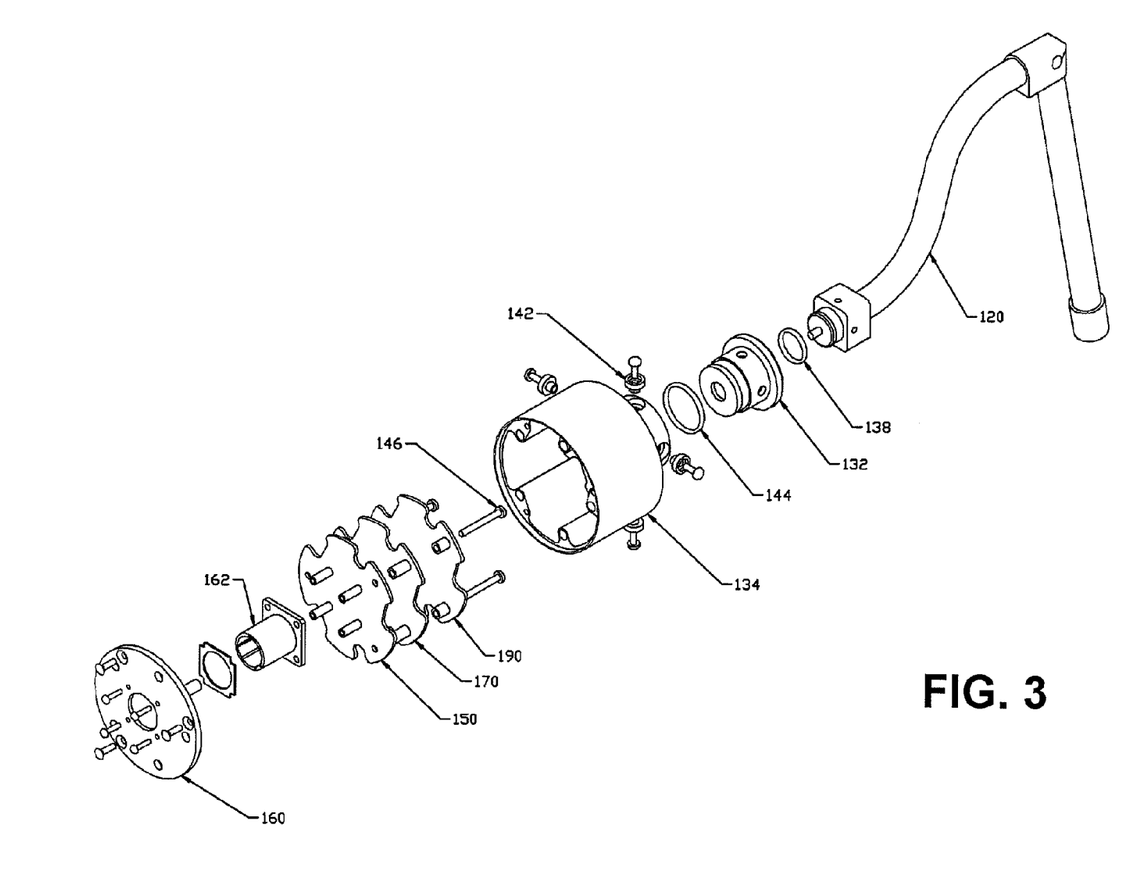
FIG. 3 is a sectional view of the probe where each portion of the probe is shown as separated prior to assembly.

The sensor 130 is connected to a proximate portion 124 of the arm 120. A better illustration of the sensor 130 is provided by FIG. 2 and FIG. 3, where FIG. 2 is a cross-sectional view of the probe 100 and FIG. 3 is a sectional view of the probe 100 where each portion of the probe 100 is shown as separated, prior to assembly. In accordance with the present embodiment, the sensor 130 is connected to the proximate portion 124 of the arm 120 by a collar 132. The collar 132 connects to both the proximate portion 124 of the arm 120 and to a housing 134 of the sensor 130. As is shown by FIG. 3, the collar 132 may be connected to the arm 120 by a male/female connection having a first collar O-ring 138 there between so as to provide an air-tight seal between the collar 132 and the arm 120, to prevent fluid immigration from inside of the tank. Of course, other connection types between the collar 132 and the arm 120 may be used instead.

The collar 132 is connected to the housing 134, thereby completing connection between the housing 134 and the arm 120. Connection between the collar 132 and the housing 134 may be provided via numerous methods, such as, but not limited to, use of a series of collar screws 142 and a second collar O-ring 144.

While the shape of the housing 134 is not instrumental, the housing 134 does provide a cover for numerous objects. As is shown by FIG. 2 and FIG. 3, a series of printed circuit boards (PCBs) are located within the housing 134. Specifically, a first PCB 150, a second PCB 170, and a third PCB 190 are located within the housing 134. The first PCB 150 is a power supply PCB. The first PCB 150 contains a power source, thereby providing power to the probe 100. Electrical components on the first PCB 150 are designed to prevent high-energy signals from propagation to the fluid.

The second PCB 170 is a digital PCB having digital logic thereon, such as, but not limited to, a processor, such as, but not limited to, a digital signal processor (DSP) 172. Functionality performed by the DSP 172 and other digital logic therein is described in detail below with reference to FIG. 4 and other figures. It should be noted that the present description refers to use of a DSP, but it should be noted that this is for exemplary purposes only, and that any processor may be supplemented.

The third PCB 190 is an analog PCB having transmitter and receiver analog circuitry for allowing the probe 100 to transmit and receive signals. Functionality performed by the analog circuitry is described in detail below with reference to FIG. 5.

The first PCB 150, second PCB 170, and third PCB 190 are provided in a stacked arrangement with a series of stacking screws 146 maintaining the PCBs 150, 170, 190 in position within the housing 134. A cover 160 is also provided for sealing contents of the sensor 130 within the housing 134. It should be noted that a sensor connector 162 is partially located within the sensor housing 134. The sensor connector 162 provides an interface for connecting of the probe 100 to an aircraft interface.

In accordance with an alternative embodiment of the invention, the power supply circuitry, transmitting and receiving logic, and digital logic may all be located on the same PCB, or on more or less than three PCBs.

Figure 4:
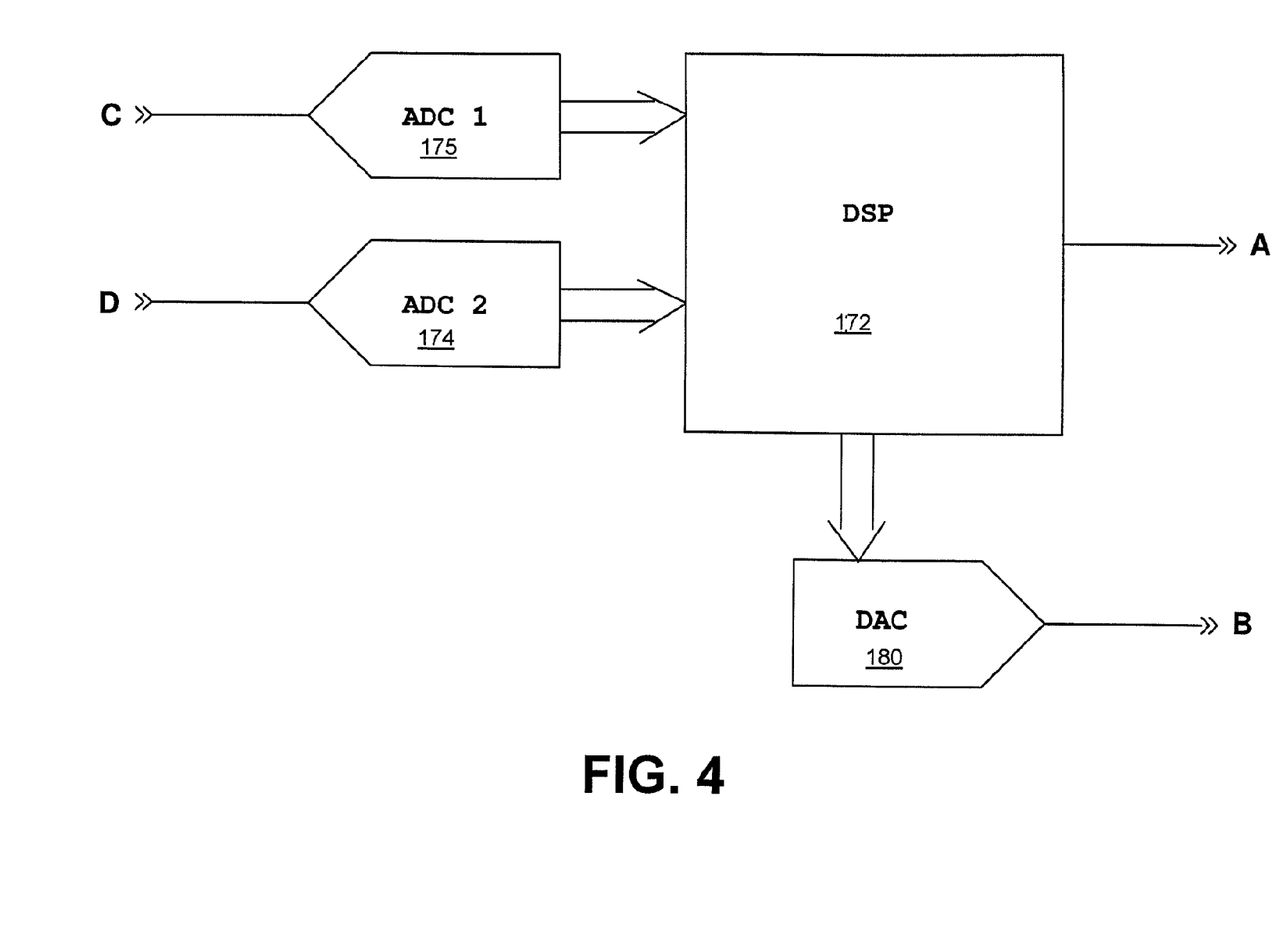
FIG. 4 is a schematic diagram further illustrating functionality and logic defined by the digital PCB of the probe.
Figure 5:
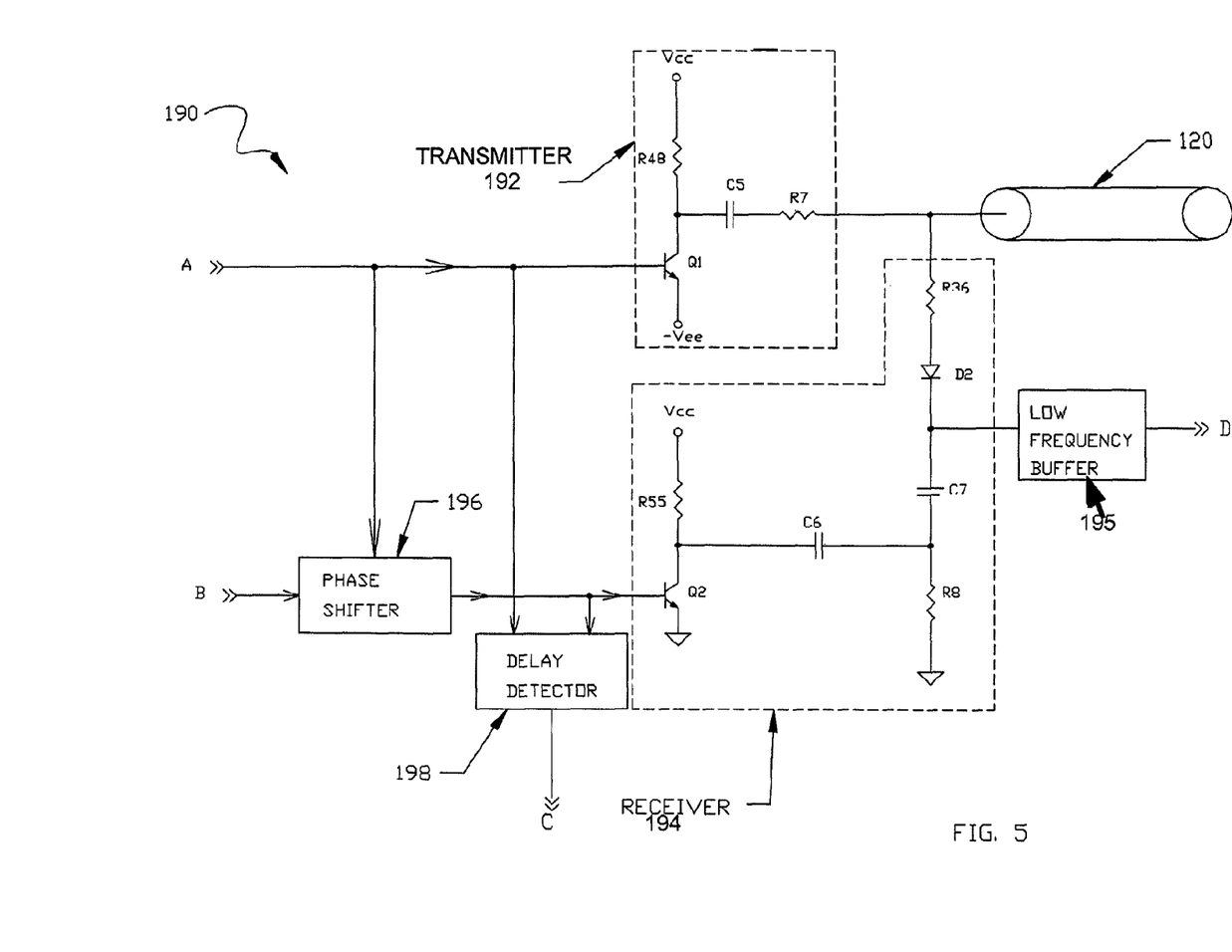
FIG. 5 is a schematic diagram further illustrating functionality and logic defined by the analog PCB of the probe.

As mentioned above, FIG. 4 is a schematic diagram further illustrating functionality and logic defined by the digital PCB 170. In addition, FIG. 5 is a schematic diagram further illustrating functionality and logic defined by the analog PCB 190. The following is a description of the sensor 130 specific to the second PCB 170 and the third PCB 190.

FIG. 5 shows an example of basic implementation of the analog transmit and receive channels. A digital signal processor (DSP) 172, as shown by FIG. 4, is provided to scan, track, and analyze associated data. A clock signal from the DSP 172 (FIG. 4) is supplied to input A (FIG. 5) and used to initiate a transmit pulse and to synchronize the receiver to the transmit pulse on the analog PCB 190. This signal activates a transmitter 192 to send an excitation pulse down the arm 120. The pulse travels down the elongated portion 110 all the way to the distal end of the elongated portion 112. The resulting reflection from the distal end 112 travels back and is captured by the receiver 194. This signal is filtered and buffered by a low frequency buffer 195 and sent to the DSP 172 to be converted to a digital signal and to be analyzed through output D.

The same clock signal that is used to initiate the transmit pulse is also provided to the receiver 194. At the receiver 194, the clock signal is phase shifted (delayed) by a phase shifter 196 by an amount commanded by the DSP 172 (FIG. 4) on input B. The receiver pulse is therefore delayed by the DSP 172 (FIG. 4) and performs a spatial scan of the elongated portion 110 length.

The actual amount of delay between the transmitter pulse and the receiver pulse is detected by a delay detector 198 and sent back as DC voltage to the DSP 172 via output C. This enables the DSP 172 to close the loop allowing the DSP 172 to have total control over the scanning function. Thus, specific discontinuities can be scanned or tracked at will.

The transmitter 192 function is performed by elements transistor Q1, resistor R48, capacitor C5, and resistor R7. Here, transistor Q1 acts as a switch to couple the energy stored in capacitor C5 onto the transmission line. Resistor R7 serves to decouple the transmitter 192 from the receiver 194. The receiver 194 function is performed by elements receiver R36, diode D2, capacitor C6, resistor R8, capacitor C7, transistor Q2, and resistor R55. Resistor R55 and resistor R8 provide a charging path for capacitor C6. Transistor Q2 serves as a switch to couple the energy stored in capacitor C6 onto resistor R8 thus turning on diode D2 via capacitor C7. Capacitor C7 in turn charges to and stores the voltage present at the transmission line, also referred to as sampling the transmission line.

FIG. 4 shows the digital PCB 170. The DSP 172 sends a clock signal to activate the transmitter 192 and receiver 194 through output A. The amount of delay is controlled by the DSP 172 via a digital to analog converter (DAC) 180 signal sent through output B to the analog PCB 190.

The amount of delay between receiver 194 and transmitter 192 pulses is sensed by analog to digital converter ADC1 (175) via a voltage into input C and converted into a digital value to be read by the DSP 172. The DSP 172 uses this signal to determine delay between the transmitter 192 and the receiver 194 and adjusts delay control output for closed loop tracking purposes.

Another analog signal fed back to the DSP 172 contains the reflection waveform from the elongated portion 110 of the probe (input D). This signal is fed into analog to digital converter ADC2 (174). From the converter, the signal is fed digitally into the DSP 172 for analysis.

Automatic Gain Adjustment of Sampling Receiver

Figure 8:
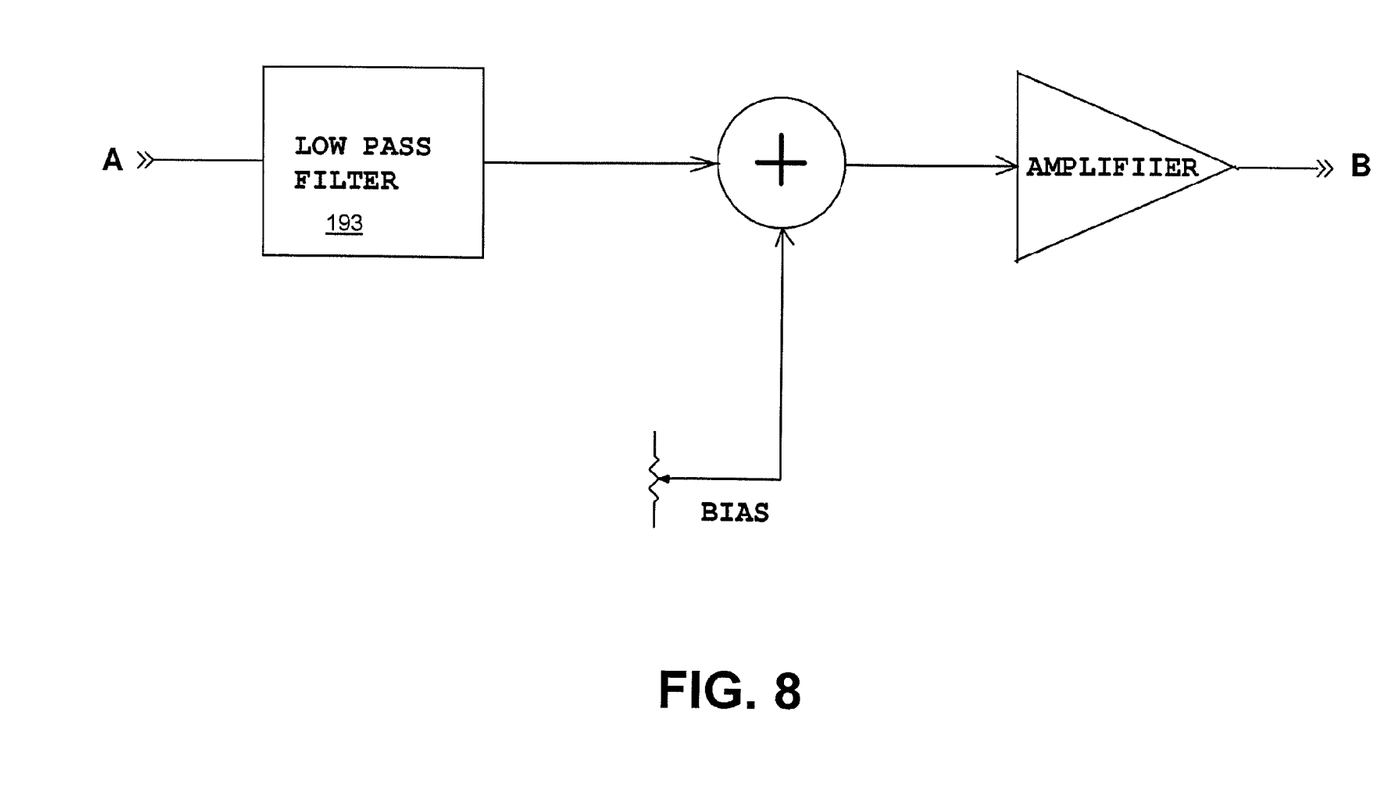
FIG. 8 is a schematic diagram illustrating an example of a low pass filter.

It should be noted that, due to different environmental factors, the signal amplitude from the receiver 194 may be adversely affected. This may lead to level detection inaccuracies. In accordance with an alternative embodiment of the invention, these effects are compensated for by increasing amplitude of the excitation pulse proportionally with the transmitter 192 output. Specifically, the output signal at D (FIG. 5), obtained during sampling of a known value, is fed into a low pass filter 193, an example of which is illustrated by FIG. 8. Preferably, the low pass filter 193 is located separate from the receiver 194 and transmitter 192, but still within the sensor 130. The resulting DC value is added to a pre-fixed bias, amplified, and added (or subtracted) to −Vee in FIG. 5. By varying −Vee, one can vary the amplitude of the transmit pulse, hence compensating for the decrease (increase) of the signal at D due to the diode variation.

Segmented Dielectric Used to Match the Impedance of a TDR Level-Measuring Probe

As has been mentioned above, the arm 120 of the probe 100 is filled with a dielectric having known impedance. Having the arm 120 of the probe 100 filled with a dielectric having a known impedance prevents the fluid that is being measured from entering into the arm 120 of the probe 100. In the alternative, if the fluid were allowed to enter into the arm 120 of the probe, there would be discontinuities in the excitation signal transmitted from the sensor 130, to the arm 120, to the elongated portion 110 of the probe 100. Specifically, each time that the fluid is encountered by the excitation signal a discontinuity in the signal occurs. Therefore, it is beneficial to minimize discontinuity by ensuring that no fluid enters the arm 120 of the probe 100. In accordance with the present invention, minimizing discontinuity is performed by, for example, filling the arm 120 with a dielectric having a known impedance. In accordance with a preferred embodiment of the invention, the impedance of the dielectric is similar to an impedance of air or an impedance of the fluid for which a level is being determined.

In accordance with the present probe 100 an excitation signal first travels from the sensor 130 to the top of the gauge-able section of the probe 100. If the impedance of the first transmission line section, namely, the arm 120 of the probe 100, is matched to that of a first media, such as the impedance of air, then there will not be an unwanted discontinuity between the first probe section and the second probe section, namely the elongated portion 110.

A discontinuity at a boundary between media, such as between the air and the fluid for which a level is being determined, will cause a desired reflection of the excitation signal for processing by the sensor 130. By design, as mentioned above, this reflection will not create any undesired extra reflections at the impedance matched top and bottom of the probe 100. Part of the excitation signal travels further in the second media, namely, the fluid for which a level is being determined, to the distal end 112 of the elongated portion 110, which is in the fluid.

Impedance of the third section of the transmission line is adjusted to match the value of the impedance of the second media, namely the impedance of the fluid. In summary, the impedance at the top of the probe 100 is matched to air, while the impedance at the bottom of the probe 100 is matched to the impedance of the fluid for which a level is being determined. It should be noted that the impedance matching may be performed by the sensor 130, by geometry of the probe 100, or by dielectric material adjustment. The excitation signal travels into the third section of the transmission line without any discontinuity to blur the level detection.

Therefore, in design of the probe 100, it is desirable to have similar dielectric of the material used to fill the arm 120, the air, and the fluid. The similarities of the dielectrics results in less discontinuities in the excitation signal being transmitted from the sensor 130, through the arm 120 of the probe 100, into the elongated portion 110 of the probe 100, and into the fluid for which a level is being determined.

Temperature Measurement of Fluid Using Time of Flight

The physical characteristics and functionality of the present probe 100 allow for the probe 100 to provide temperature measurement of fluid. This process is described in detail herein and performed by the DSP 172. Specifically, in processes where fluid level measurement is monitored, it is often desirable to know the fluid temperature as well. Knowing the fluid temperature may prove useful for process control or adjustments to fluid level readings itself to compensate for volume of fluid changed due to temperature. The present probe 100 alleviates the prior need for utilizing a separate, independent temperature sensor, and instead, integrates the properties of a temperature measurement sensor with the level measurement properties of the probe 100, resulting in a probe with less wiring and less intrusion into the process, and therefore, better reliability.

By knowing the dielectric constants of the fluids (e.g., air and gas) in various temperatures, the temperature of the fluid being measured can be deduced by measuring the actual dielectric constant of the fluid and comparing the measured actual dielectric constant to a chart having known dielectric constant values. As an example, consider, for example, a hydrocarbon fluid. The propagation velocity of the signal in the fluid having a dielectric constant $\in_1$ at certain temperature is shown by equation 1.

$$V = \frac{C}{\sqrt{\varepsilon_1}} \qquad \text{(Eq. 1)}$$

In equation 1, C is speed of light.

As the fluid temperature changes, its dielectric also changes to $\in_2$.

The relationship between the propagation velocities may be represented by equation 2.

$$\frac{V_1}{V_2} = \sqrt{\frac{\varepsilon_2}{\varepsilon_1}} \qquad \text{(Eq. 2)}$$

In equation 2, $\in_1$ is the dielectric constant at, for example, 25° C. and $\in_2$ is the dielectric constant at unknown temperature T. Equation 2 may be rewritten as equation 3 below.

$$\varepsilon_2 = \varepsilon_1 \left(\frac{V_1}{V_2}\right)^2 \qquad \text{(Eq. 3)}$$

Knowing $\in_1$ and $V_1$, and by using a lookup table of $\in$. values in various temperatures for this particular fluid, the actual temperature T of the fluid can be determined. Alternatively, as shown by equation 4, if one knows the real length of the fluid column L, and the perceived length L' (time of flight measured from fluid surface to bottom of tank), one can calculate the dielectric constant of the fluid at the current temperature (whatever it is) $\in_T$:

$$\varepsilon_T = \varepsilon_1 \left(\frac{L'}{L}\right)^2 \qquad \text{(Eq. 4)}$$

By looking up $\in_T$ and $\in$ in a lookup table ($\in$ is dielectric constant of this fluid at 25° C.) one can tell the temperature of the fluid.

It should be noted that alternative embodiments of the invention may be provided for measuring in situ temperature to compensate for dielectric changes due to temperature. As an example, in accordance with a second exemplary embodiment of the invention, a thermistor may be placed in the gauging portion of the probe 100 in direct contact with the fluid being measured. The main characteristic of a thermistor is the ability of the thermistor to change impedance according to the temperature to which it is exposed. The sensor 130 of the probe 100 then detects the thermistor impedance change and correlates the impedance change to a fluid temperature.

Alternatively, in accordance with a third exemplary embodiment of the invention, the thermistor may also be located within the gauging portion, however, circuitry for sensing thermistor impedance may need to be connected to the probe 100.

Fluid Level Determination Via Pulse Time of Flight Thru Fluid

A pulse transmitted out into a transmission line will be partially or fully reflected back to the transmit port whenever the characteristic impedance of the transmission line changes. The characteristic impedance of a transmission line will change with the dielectric. Different transmission line geometries (coax, parallel wire, etc.) will have different relationships for characteristic impedance changes in different dielectrics. For a given transmission line geometry the dielectric changes in the transmission line will cause predictable changes in characteristic impedance.

A level measuring system, the probe 100, is designed to have a transmission line that passes thru different dielectrics. The transmission line will then have a very large impedance change at its end (open or short circuit). This very large impedance change in the transmission line will cause a very strong reflection at its end.

A level measuring system could have a pulse travel in a transmission line that is placed in a medium of known dielectric. Part of the distance the pulse will travel will be in air (air dielectric) another part of the distance is traveled in a medium (medium dielectric). Using Equation 1, a velocity of propagation for each medium can be determined. The total distance traveled (length of transmission line) is known. By analyzing the reflected waveform the travel time from the beginning of the transmission line, thru both dielectrics, to the large impedance mismatch at the end of the transmission line can be measured. The distance traveled in the medium can be derived by use of equation 5 hereafter, which assumes that velocity in air is C.

$$|H|=[D-C(T)]/[1-\text{sqrt}(\in_m)] \quad \text{(Eq. 5)}$$

In equation 4:

D=total distance of transmission thru both air and medium. This is the length or height, of the medium;

C=speed of light;

$\in_m$=dielectric of medium;

T=total time for a pulse or signal to travel thru both the air dielectric transmission line part and the medium dielectric part of the transmission line to the end of said transmission line;

H=height of medium=the distance traveled in only medium dielectric part of the transmission line; and sqrt=square root.

Finding Dielectric Constant in TDR where the Temperature is Known

Figure 6:
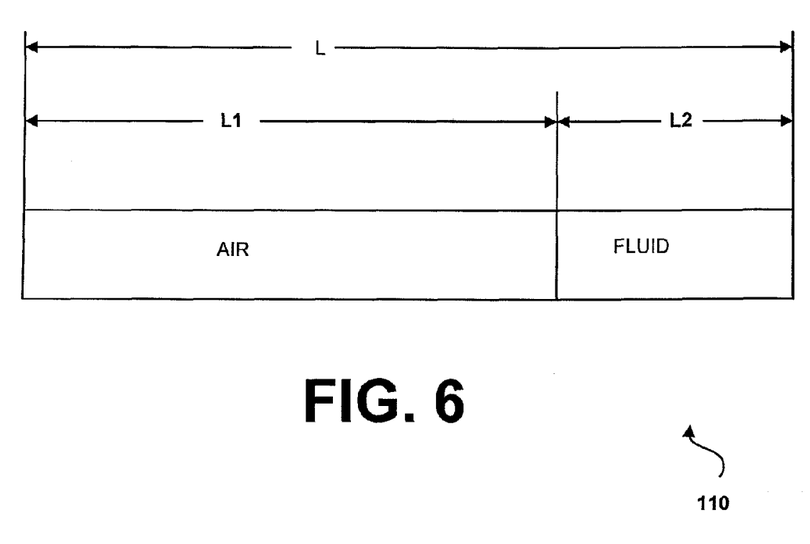
FIG. 6 is a schematic diagram illustrating an example of the elongated portion of the probe of FIG. 1 for purposes of determining the dielectric constants of fluids, where temperature of the fluid is known.

FIG. 6 is a schematic diagram illustrating an example of the elongated portion 110 of the probe 100 for purposes of determining the dielectric constants of fluids, where temperature of the fluid is known. Length L, which is length of the elongated portion 110, is known, while length L1, which is length of the elongated portion 110 having air therein, and length L2 which is length of the elongated portion 110 having fluid therein, are measured by time of reflections, also referred to herein as time of flight.

In accordance with the present invention, the probe 100 may also be used to determine dielectric constants of fluids, where the temperature of the fluid is known. This process is described in detail herein and performed by the DSP 172. If the temperature of the fluid is known, the dielectric constant of the fluid can be deduced by measuring the perceived length of the coaxial tube (elongated portion 110) immersed in the fluid. Since the real length of the tube, or elongated portion 110, is known, the dielectric constant of the fluid can be calculated at this temperature from the ratio of the perceived length and real length of the fluid columns (L2 in FIG. 6). Equation 4 may be referred to for further explanation.

By using a lookup table of temperature and dielectric constant $\in_t$ for this particular fluid, dielectric constant $\in$ in 25° C. can be determined. In addition, theoretical dielectric constant $\in$ can be compared to actual dielectric constant $\in_T$ above to detect possible contamination in the fluid if the two are not the same.

Find and Lock Level

Figure 7:
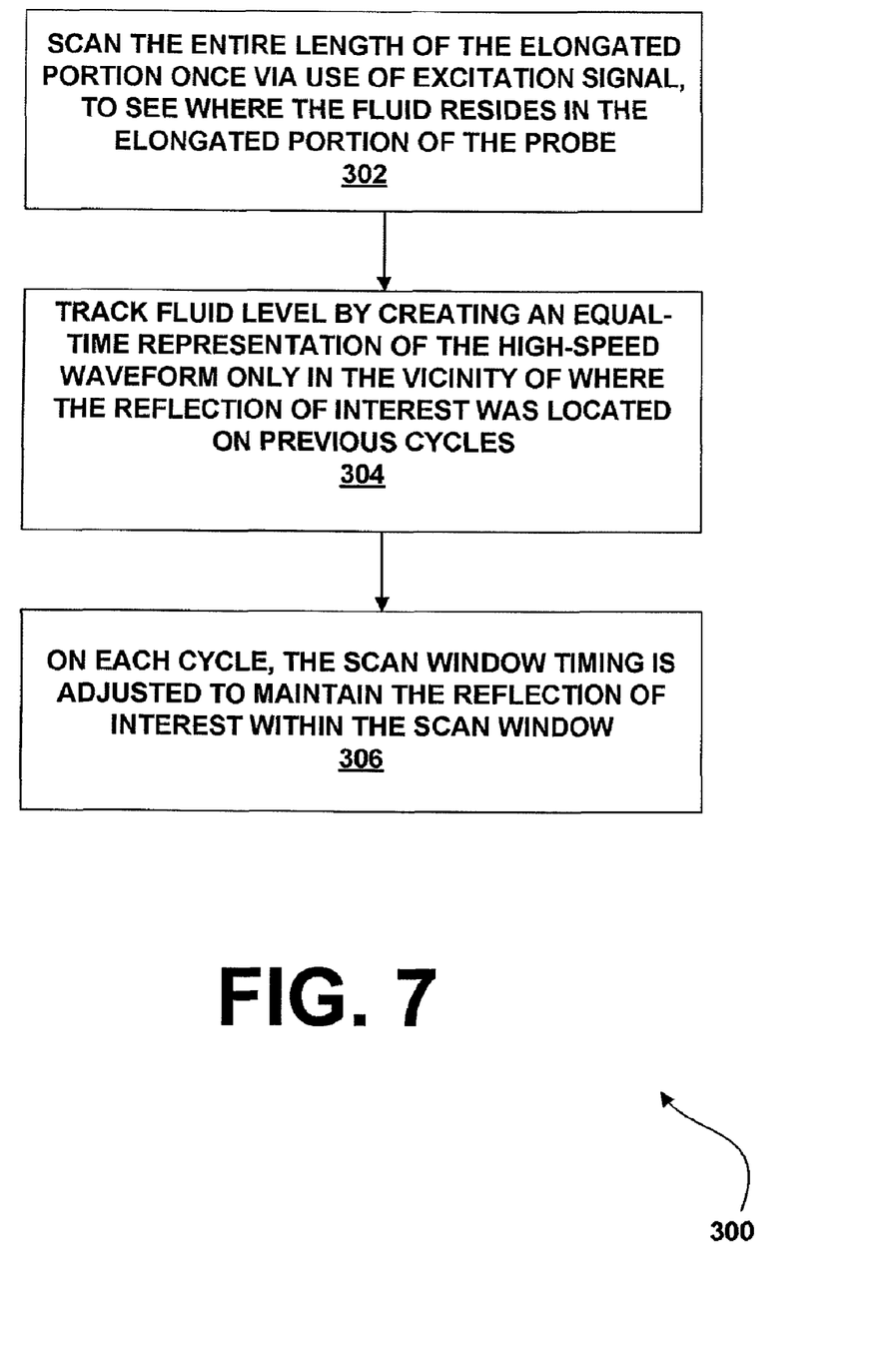
FIG. 7 is a flowchart illustrating a method used by the probe to scan and lock on a fluid level, in accordance with the first exemplary embodiment of the invention.

In accordance with the first exemplary embodiment of the invention, in order to provide fast fluid level scanning with reduced sensor processing time, the probe 100 is capable of tracking fluid level. Specifically, in the present fluid level measuring probe 100 very high speed reflecting waveforms need to be analyzed to determine positional changes in dielectric material caused by changes in fluid level. FIG. 7 is a flowchart 300 illustrating a method used by the probe 100 to scan and lock on a fluid level, in accordance with the first exemplary embodiment of the invention.

It should be noted that any process descriptions or blocks in flow charts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

Instead of continuously scanning the entire length of the elongated portion 110 for the level detection, as shown by block 302, the present probe 100 scans the entire length of the elongated portion 110 once via use of the excitation signal, to see where the fluid resides in the elongated portion 110 of the probe 100, also referred to as the current fluid level. One method of analyzing high-speed waveforms, such as the interrogation (excitation) signal provided by the sensor 130, is to use an aliasing sampling system to create a slower "equal time" waveform. The probe 100 can preserve the shape of the original very fast periodic waveform and render the waveform at a much slower rate. Sweeping a very narrow sampling point along a repeating waveform does this. Each time the high-speed waveform is repeated, a single narrow sample of the waveform is taken by the sensor 130. At regular intervals, the sampling window is delayed in time to sample the next fragment of the high-speed waveform. After many waveforms, the samples are combined by the sensor 130 into a slower representation of the original high-speed waveform which is suitable for processing by the DSP 172.

By analyzing the equal-time waveform, the reflection of interest can be located. The reflection of interest represents the current fluid level on the elongated portion (110) of probe 100. As shown by block 304, once the position of the current fluid level is determined, the fluid level is tracked by creating an equal-time representation of the high-speed waveform only in the vicinity of where the reflection of interest was located on previous cycles. As shown by block 306, periodically, the scan window timing is adjusted to keep the reflection of interest within the scan window.

Scanning only where the fluid level can be expected and tracking the level greatly cuts required sensor processing time. Having a decreased sensor processing time allows a much faster system response rate for determining fluid level. This also results in a less costly system and less power consumption.

Intrinsically Safe Coaxial TDR with Low RF Transmission/Susceptibility for Aircraft Applications Using a metallic coaxial tube (the combination of the arm 120 and the elongated portion 110) offers a unique advantage of low radio frequency emissions for the TDR device. This is extremely important for air borne application where the aircraft instrumentation is extremely sensitive to radiated noise. It also makes radio frequency reception by the TDR (susceptibility) less likely.

The probe 100 has an added benefit in case of flammable fluids immersion. An electrical spark can ignite the fluid in which the transmission line is immersed. By shrouding the inner conductor of the elongated arm 110 by an outer metallic tube, a spark between the inner conductor and the tank in which the fluid is held is prevented. By electrically connecting the outer tube to the tank, an electric potential difference between the tank and the elongated tube (110) is prevented, thus, reducing the possibility of a spark.

The amount of energy delivered into the measured fuel is limited by capacitor C5 (FIG. 5). The capacitor prevents a direct current from flowing into the fuel. The only energy delivered is in a form of a pulse. This pulse has a limited energy dictated by the capacitance of C5. By maintaining the capacitance low, the amount of energy entering the fluid is kept below a critical amount needed for ignition.

Another safety feature is the addition of voltage surge suppressors to the power supply that powers the probe 100 and communications inputs to the probe 100. These limit the amount of energy that can reach the fuel in case of a short circuit or over voltage transient.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. An apparatus for measuring a level of a liquid comprising:
    a first coaxial cable section including a first center conductor, a first outer conductor and a solid dielectric between the first center conductor and first outer conductor;
    a second coaxial cable section including a second center conductor wherein the second center conductor is a unitary extension of the first center conductor, a second outer conductor and an air dielectric between the second center conductor and second outer conductor; and
    a coupling between the first and second coaxial cable sections, wherein the second coaxial cable section is disposed in a liquid for determining a level of the liquid;
    wherein the coupling includes a center conductor, an outer conductor and a dielectric extending therebetween, and at least part of the dielectric of the coupling is an air dielectric and communicates with the air dielectric of the second coaxial cable section.

2. The apparatus as in claim 1, wherein the second coaxial cable section includes an end cap.

3. The apparatus as in claim 2, wherein the end cap includes at least one vent aperture to permit fluid or air to flow therethrough.

4. The apparatus as in claim 1, wherein the outer conductor of the coupling includes at least one vent aperture to provide communication between the air dielectrics of the coupling and the second coaxial cable section to the ambient surroundings.

5. The apparatus as in claim 4, wherein the coupling is configured to permit the first and second coaxial cable sections to be aligned at a predetermined angle to one another.

6. A fluid level gauge assembly for measuring a level of a fluid in a fluid container, the fluid container including a top, a bottom and at least one side wall, the fluid level gauge assembly comprising:
    a first coaxial cable section having a first end and a second end, the first coaxial cable section including a first center conductor, a first outer conductor and a solid dielectric between the first center conductor and first outer conductor;
    a second coaxial cable section having a first end and a second end, the second coaxial cable section including a second center conductor wherein the second center conductor is a unitary extension of the first center conductor, a second outer conductor and an air dielectric between the second center conductor and second outer conductor; and
    a coupling between the second end of the first coaxial cable section and the first end of the second coaxial cable section, wherein the second coaxial cable section is disposed in a fluid for determining a level of the fluid, the coupling includes a center conductor, an outer conductor and a dielectric extending therebetween, and at least part of the dielectric of the coupling is an air dielectric and communicates with the air dielectric of the second coaxial cable section.

7. The fluid level gauge assembly as in claim 6, wherein the first end of the first coaxial cable section is configured for connection to a time domain reflectometer.

8. The fluid gauge assembly as in claim 6, wherein the coupling is coupled to the top of the fluid container and the second end of the second coaxial cable section is disposed adjacent to the bottom of the fluid container.

9. The fluid gauge assembly as in claim 8, wherein the coupling is configured to permit the first and second coaxial cable sections to be aligned at a predetermined angle to one another.

10. The fluid gauge assembly as in claim 8, wherein the second end of the second coaxial cable section is positioned a predetermined distance from the bottom of the fluid container.

11. The fluid gauge assembly as in claim 10, further comprises an end cap disposed on the second end of the second coaxial cable section.

12. The fluid gauge assembly as in claim 11, wherein the end cap includes at least one vent aperture to permit fluid or air to flow therethrough.

13. The fluid gauge assembly as in claim 6, wherein the coupling is coupled to the bottom of the fluid container and the second end of the second coaxial cable section is disposed adjacent to the top of the fluid container.

14. The fluid gauge assembly as in claim 6, wherein the outer conductor of the coupling includes at least one vent aperture to provide communication between the air dielectrics of the coupling and the second coaxial cable section to the ambient surroundings.

* * * * *